March 2, 1943.  A. F. BRADLEY  2,312,520
MULTIWIRE PRODUCT MAKING MACHINE
Filed May 11, 1940  6 Sheets-Sheet 2

Inventor
Albert F. Bradley
by Charles H. Hill Attys

March 2, 1943. A. F. BRADLEY 2,312,520
MULTIWIRE PRODUCT MAKING MACHINE
Filed May 11, 1940 6 Sheets-Sheet 3

Inventor
Albert F. Bradley
by Charles O'Neill Attys

Patented Mar. 2, 1943

2,312,520

UNITED STATES PATENT OFFICE 2,312,520

MULTIWIRE PRODUCT MAKING MACHINE

Albert F. Bradley, Sterling, Ill., assignor to Northwestern Steel and Wire Company, Sterling, Ill., a corporation of Illinois Application May 11, 1940, Serial No. 334,515

7 Claims. (Cl. 29—34)

This invention relates to the successive drawing and fabricating of a plurality of metal rods into wire products such as nails, bolts, rivets, pins and the like.

More specifically the invention relates to a wire product making machine capable of simultaneously acting upon a plurality of metal rods or wires to simultaneously draw the same into wires of desired diameters and then fabricate the wires into nails, bolts or the like in such a manner that each stroke of the machine produces a plurality of fabricated articles.

While the invention will be hereinafter described as embodied in a machine for making a plurality of wire nails during each stroke thereof, it should be understood that the invention is not limited to such use and that the machine is highly flexible and can be replaced with fabricating dies, other than the dies illustrated, to produce fabricated wire products other than nails.

In the Albert F. Bradley United States Letters Patent No. 2,107,745 dated February 8, 1938, there is described and claimed a machine for making wire products, such as nails, from metal rods or wire. This machine includes both a wire drawing end and a fabricating end. However, the machine disclosed is only capable of making one nail, or other fabricated wire product, during each stroke thereof.

The present invention now provides a combined wire drawing and wire fabricating machine capable of producing a plurality of fabricated wire products during each stroke thereof. While the machine illustrated in the drawings only operates on two rods or wires to simultaneously produce two nails during each stroke thereof, it should be understood that any number of rods can be used by mere addition of drawing dies, gripping clutches and cutting dies. The machines of this invention preferably only include a single heading or upsetting device capable of acting upon all of the wires.

It is, then, an object of the invention to provide a combined wire drawing and wire fabricating machine capable of simultaneously acting upon a plurality of wires or rods to produce a plurality of fabricated wire articles during each stroke of the machine.

Another object of the invention is to provide improvements in wire fabricating machines for increasing the production thereof.

A further object of the invention is to provide a combined wire drawing and wire fabricating machine capable of acting on a plurality of wires and having throw-out devices and clutches to selectively interrupt the feeding of one or more wires through the machine.

A specific object of the invention is to include a wire fabricating machine having a wire drawing end capable of handling a plurality of wires and having disengaging clutches to interrupt the operation on any desired wire.

A further specific object of the invention is to provide a toggle-operated disengaging clutch for a wire pulling drum in a wire fabricating machine.

Other and further objects of the invention will be apparent to those skilled in the art from the following detailed description of the annexed sheets of drawings which disclose a preferred embodiment of the invention.

Figure 1:
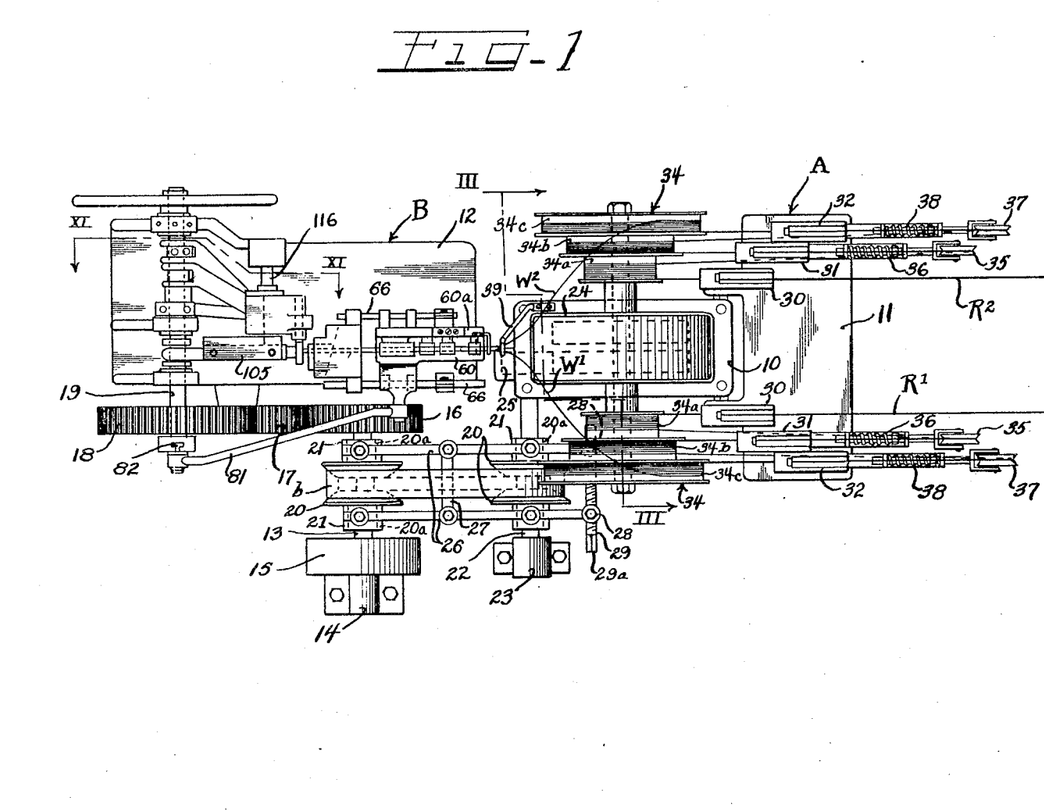
Figure 1 is a top plan view of a multi-wire product making machine according to this invention.
Figures 2, 12:
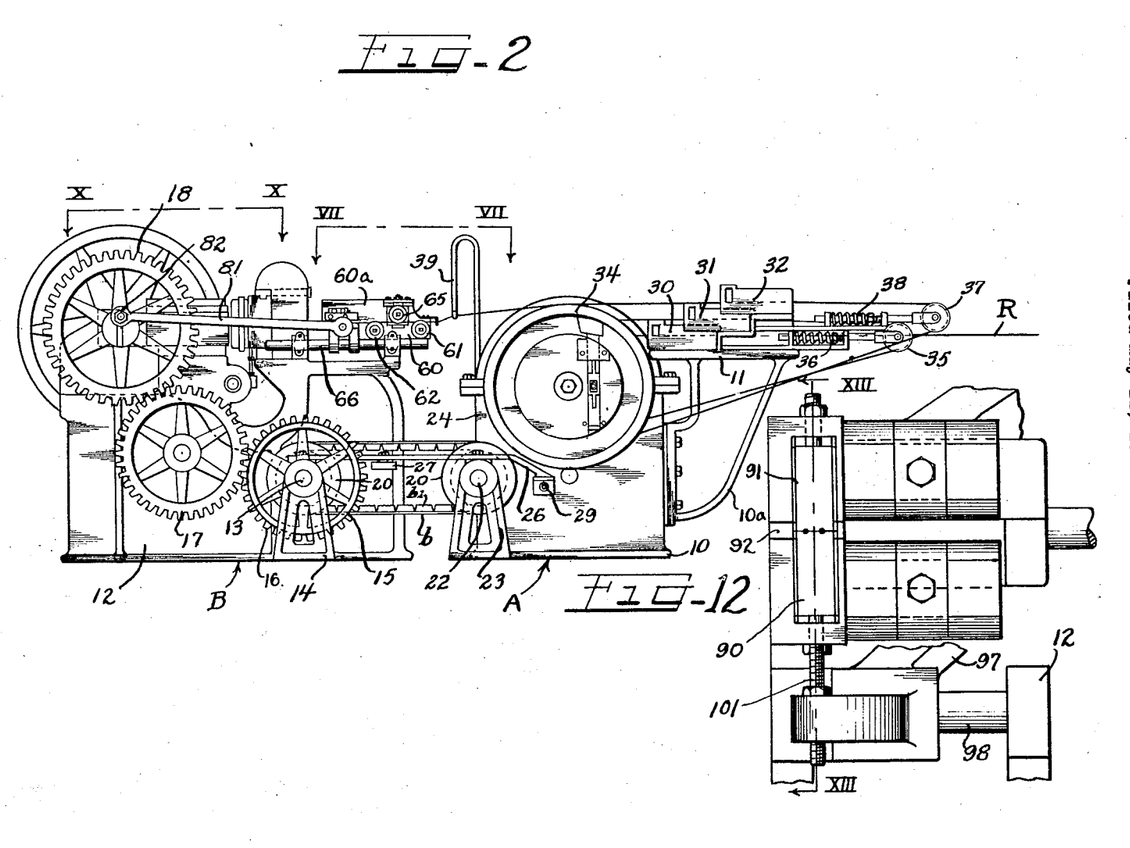
Figure 2 is a side elevational view of the machine shown in Figure 1.
Figure 12 is a transverse elevational view taken along the line XII—XII of Figure 11.

In Figures 1 and 2 the reference character A designates generally the wire drawing end of the machine while the reference character B designates generally the wire fabricating end of the machine.

The wire drawing end A of the machine is built up on a frame or bed 10 carrying brackets 10a on the inlet end thereof with a table top 11 formed thereon. The fabricating end B of the machine is built up on a framework or bed designated generally by the reference numeral 12.

A main drive shaft 13 projects laterally from the frame 12 and is rotatably mounted at its outer end in a bearing 14 supported from the floor or other support in laterally spaced relation from the framework 12. A pulley 15 is mounted near the outer end of the shaft 13 and is adapted to be connected through a belt (not shown) with a prime mover (not shown).

The inner end of the main drive shaft 13 has a gear 16 keyed thereon meshing with an intermediate gear 17. The intermediate gear 17 in turn meshes with a main driving gear 18 secured to the main shaft 19 of the fabricating end B.

The main drive shaft 13 has opposed friction cone elements 20 slidably mounted thereon intermediate the ends thereof. The cone elements 20 rotate with the shaft 13. Each element 20 is provided with a laterally projecting hub portion 20a loosely mounted in a collar 21 for a purpose to be hereinafter more fully described.

A drive shaft 22 for the wire drawing end A of the machine projects laterally from the main frame 10 of the wire drawing end as best shown in Figure 1. This drive shaft 22 is rotatably mounted at its outer end in a bearing bracket 23 fixed on the floor or other support in spaced lateral relation from the frame 10. The inner end of the drive shaft 22 projects through a gear housing 24 and has a gear 25 mounted thereon.

Opposed friction cone elements 20 identical with the previously described elements 20 are also slidably mounted on the drive shaft 22 intermediate the ends thereof. These cone elements have hubs 20a and collars 21 loosely fitted around the hubs. The cone elements are thus slidably mounted on the shaft but serve to drive the shaft when rotated.

A pair of levers 26 are pivotally connected to the collars 21 of the friction cone elements on the drive shaft 13 and are also pivotally connected to the collars 21 on the other set of friction cone elements 20 on the drive shaft 22. A cross bar 27 is mounted between the sets of cone elements and is pivoted to the intermediate portions of the levers 26. One pair of adjoining free ends of the levers 26 receive swivel nuts 28 thereon. The nuts 28 are threaded on oppositely threaded portions of the adjusting rod 29. When the adjusting rod 29 is rotated to move the free ends together or apart, the cone elements 20 on the drive shaft 22 are moved together or apart while the cone elements 20 on the drive shaft 13 are moved in the opposite direction.

A belt b is trained between the pairs of cone elements as shown and the drive shaft 22 is thus driven from the drive shaft 13 through the belt. The adjustment of the cone elements makes possible an adjustment in the relative driving speeds of the drive shafts 13 and 22. As best shown in Figure 2, the belt b preferably has frusto-pyramidal driving elements $b_1$ secured on the inner face thereof in spaced relation so as to be contiguous when passing about the cone elements and to be spaced at their inner ends when extending between the sets of cone elements. From the above description it should therefore be understood that a single prime mover driving the drive shaft 13 through the pulley 15 drives both the wire drawing end A and the wire fabricating end B of the machine. The relative speeds of the two parts can be nicely adjusted by means of the friction cone members.

*The wire drawing end of the machine*

As best shown in Figures 1 and 2 the table 11 of the wire drawing end A of the machine supports wire drawing dies 30, 31 and 32 on each side thereof. Rods $R_1$ and $R_2$ are pulled through the inner drawing dies 30 by means of wire drawing drums 34 rotatably mounted in front of the dies. Each drum 34 includes a plurality of wire pulleys 34a, 34b and 34c of progressively increasing diameter. The wire from the first dies 30 is wrapped around the smallest or innermost pulleys 34a. The wires pass from the pulleys 34a back to the inlet end of the machine around sheaves 35 in alignment with the next drawing dies 31. The sheaves 35 are urged away from the inlet ends of the dies 31 by means of springs 36 so as to keep the wires in a taut condition. The wires then pass through the next reducing or drawing dies 31 and are wrapped around the intermediate drawing pulleys 34b. The double drawn wire is then threaded back to the inlet end of the machine around sheaves 37 aligned with the dies 32 and spring urged away from the dies by means of springs 38 to keep the wire in taut condition. The wire is then pulled through the final reducing dies 32 by means of the largest pulleys 34c on the drums 34. The wires are wrapped around these pulleys for several turns and are then threaded through the eye of a spring finger 39 from which they travel into the fabricating end of the machine.

The pulleys 34a, 34b and 34c are of progressively increasing diameters so as to compensate for the elongation of the wires caused by the successive drawing dies each of which reduce the initial rod to a lesser diameter and thereupon lengthen the resulting wire.

Figure 4:
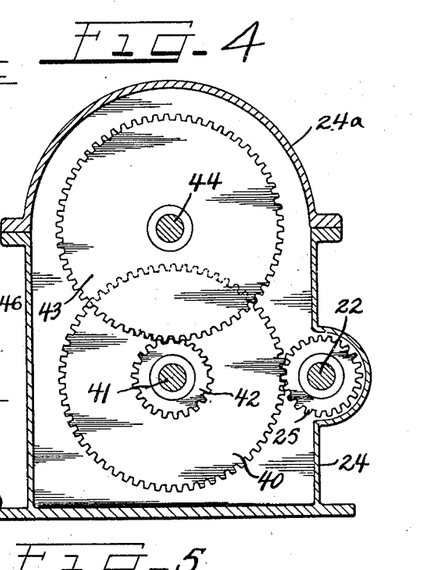
Figure 4 is a vertical cross-sectional view taken along the line IV—IV of Figure 3.

As shown in Figure 4, the drive shaft 22 for the wire drawing end of the machine extends into a housing 24 formed on the main frame 10 of the machine and drives a pinion 25 keyed thereon and mounted in the housing. The pinion 25 engages a gear 40 secured on a shaft 41 extending through the housing. The shaft 41 drives a pinion 42 meshing with a large gear 43 keyed to a shaft 44 extending through the top portion of the housing. As shown in Figure 4, the housing 24 is closed with a cover 24a.

Figure 3:
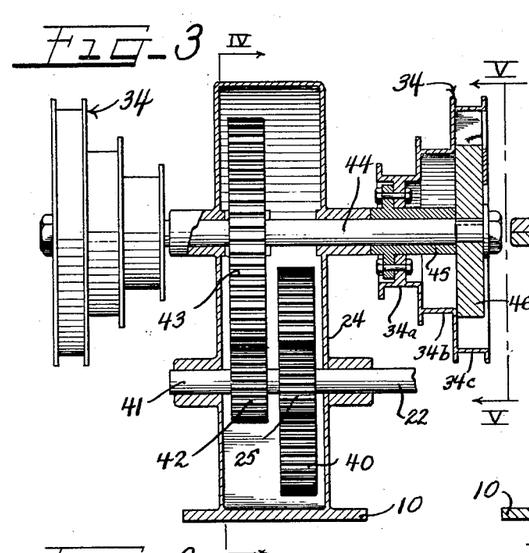
Figure 3 is an enlarged vertical cross-sectional view, with parts in elevation, taken along the line III—III of Figure 1.

The shaft 44 extends laterally from both sides of the housing 24 and receives the wire drawing drums 34 on its outer ends as shown in Figure 3. Sleeves such as 45 are loosely mounted on the ends of the shaft 44 and are bolted to the inner or smaller pulleys 34a of the drawing drums 34. The drums 34 are thus freely mounted on the ends of the shaft 44 and can rotate relative thereto.

Discs such as 46 are keyed on the outermost ends of the shaft 44 and are mounted within the larger pulleys 34c of the drawing drums 34. These discs 46 rotate with the shaft 44.

Figure 5:
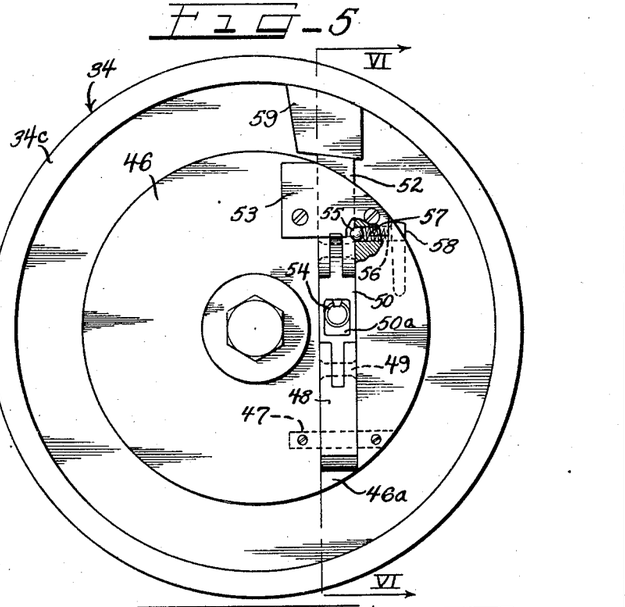
Figure 5 is an enlarged end elevational view taken along the line V—V of Figure 3 with parts in vertical cross section.
Figure 6:
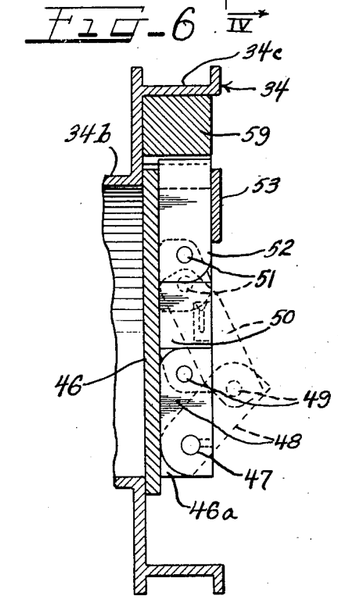
Figure 6 is a fragmentary vertical cross-sectional view taken along the line VI—VI of Figure 5.

Clutches, best shown in Figures 5 and 6, are provided between the discs 46 and the large pulleys 34c of the drawing drum 34 to drive and stop the drums.

As shown in Figures 5 and 6 the disc 46 has a groove 46a in the outer face thereof. The groove is spaced from the axis of the disc and communicates with the circumference of the disc at its ends. A pin 47 is secured in the disc and extends across the groove near one end thereof to pivotally carry a toggle arm 48 adapted to be seated in the groove and moved out of the groove as shown in dotted lines in Figure 6. The top end of the arm 48 is pinned by means of a pin 49 to a second arm 50 also seatable in the groove. A pin 51 extends through the upper end of the arm 50 and pivotally supports a slide 52 mounted in the groove 46a. A face plate 53 is secured to the disc 46 to hold the slide 52 in the groove. The free end of the slide 52 projects beyond the circumference of the disc 46 when the toggle arms 48 and 50 are aligned and seated in the groove as shown in Figure 5. The arm 50 has a recess 50a in the outer face thereof as shown in Figure 5 and a pull ring 54 is mounted in the recess. The pull ring is adapted to be manually engaged for pulling the toggle arms 48 and 50 out of the groove as shown in dotted line position in Figure 6 to retract the slide 52 within the confines of the disc 46.

A side wall of the slide preferably has a recess therein to receive a spring-urged detent 55 as shown in Figure 5. For this purpose the disc 46 can be drilled to provide a well 56 therein receiving the ball 55 and a spring 57 urging the ball into the recess of the slide 52. A pin 58 seated in a well drilled at right angles to the well 56 holds the spring 57 in position.

The pulley 34c of the winding drum 34 has a wedge block 59 secured under the flange thereof and is adapted to receive the slide 52 in wedging engagement thereagainst when the toggle arms are seated in the groove 46a. Thus, rotative movement of the disc 46 is transmitted to the winding drum 34 through the toggle clutch arrangement which effects wedging engagement between the slide 52 and the wedge block 59. When it is desired to stop a drum without stopping the other drum, the pull ring 54 can be engaged and pulled outwardly to retract the slide 52 out of wedging engagement with the block 59. In this manner clutches selectively control the operation of the winding drums independently of the drive shaft 44 which drives both drums.

Thus when it is desired to stop pulling one of the rods R1 or R2 into the machine, the drawing drum 34 acting on this rod can be stopped while the machine can be permitted to operate on the other rod alone.

*The wire fabricating end of the machine*

Drawn wires W1 and W2 from the winding pulleys 34c are threaded through the eye of a spring arm 39 which acts as a tensioning device. The wire drawing end of the machine A can be spaced at a greater distance from the wire fabricating end of the machine B than shown in Figure 1 so that the wires W1 and W2 will not be abruptly bent over the pulleys 34c as they pass to the spring arm 39.

The wire fabricating end B of the machine carries a table 60 with a vertical flange 60a thereon as shown in Figures 1, 2, 7 and 8 rotatably carrying grooved guide wheels 61 and 62 receiving the wires W1 and W2 thereover. A slide block 63 is slidably mounted in a recess of the wall portion 60 and rotatably carries a third grooved guide wheel 64 between the guide wheels 61 and 62. An adjusting bolt 65 is provided to urge the slide block 63 downwardly for moving the guide wheel 64 against the tops of the wires W1 and W2. These guide wheels can thus be used to straighten out the wires.

The table 60 is slidably mounted on rods 66 carried by the main frame 12 of the part B and is adapted to be reciprocated along these rods.

Figures 7, 8, 9:
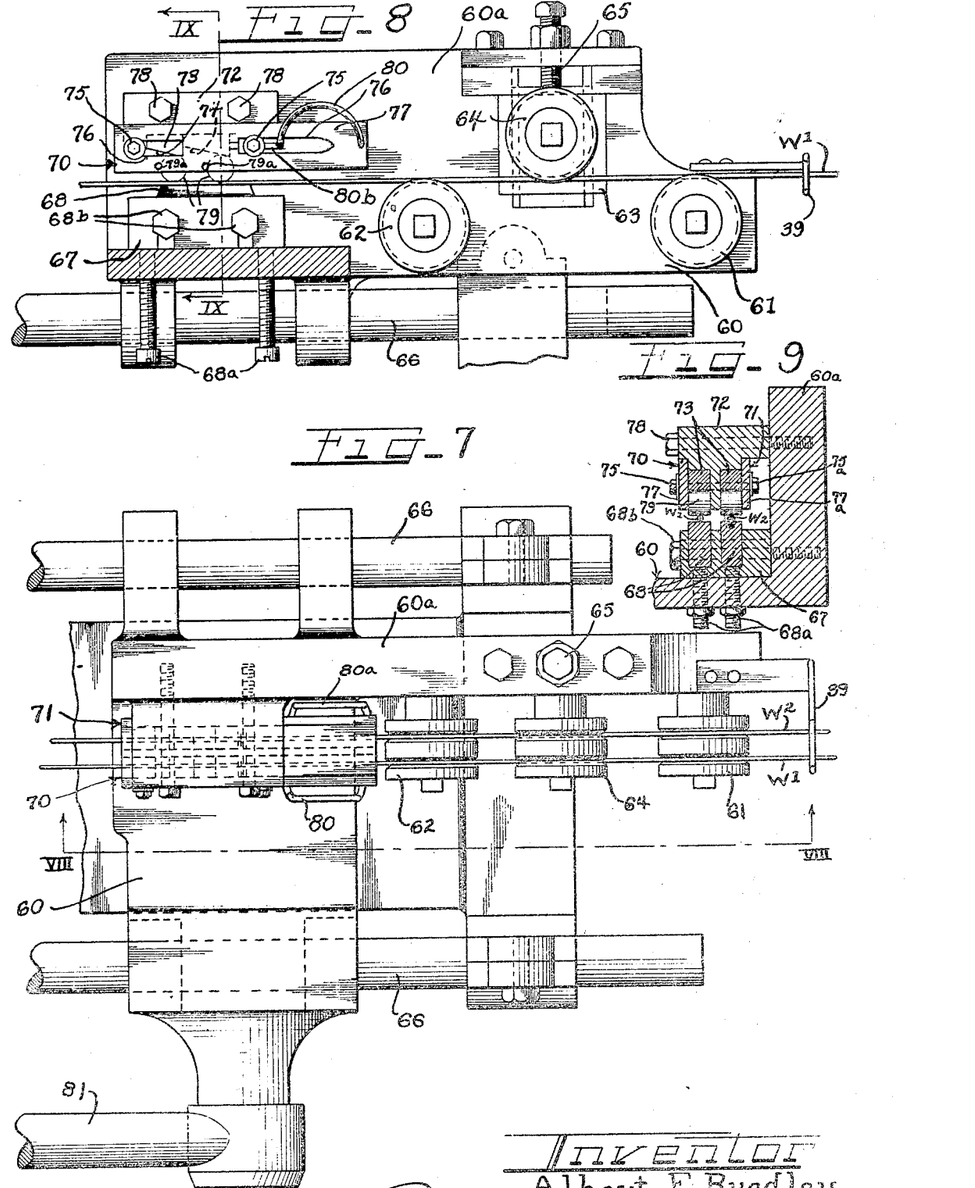
Figure 7 is an enlarged fragmental top plan view of a portion of the machine viewed along the line VII—VII of Figure 2.
Figure 8 is a cross-sectional view, with parts in elevation, taken along the line VIII—VIII of Figure 7.
Figure 9 is a vertical cross-sectional view taken along the line IX—IX of Figure 8.

The table 60 carries a bottom block 67 fixedly bolted thereon as shown in Figures 8 and 9 in which are mounted anvils 68 adapted to receive the wires thereover. The anvils 68 are vertically adjustable in the block 67 by means of adjusting screws 68a and clamped in adjusted position by means of bolts 68b.

As shown in Figures 7, 8 and 9, the table 60 carries separate wire gripping and feed roller clutches 70 and 71 above the anvils 68 for engaging and gripping the wires W1 and W2 respectively to move the same through the fabricating end of the machine. These clutches are adapted to slide over the wires on the reverse stroke of the machine and pull the wires forwardly on the operating stroke of the machine. The guide wheels reciprocate with the clutches since the same are all mounted on the table 60.

As best shown in Figure 9, the clutches include a common housing 72 carried by the flange 60a of the table 60 and carrying cam blocks 73 each providing a pair of roller clutch cam surfaces 74 facing the sides of the wires W1 and W2 opposite the anvils 68. Guide pins 75 and 75a extend from the members 73 through slots 76 in slidable bars 77 and 77a fittted in grooves in the sides of the block 72. Bolts 78 hold the housing 72 on the table flange 60a. Pairs of clutch rollers 79 are mounted in the housing 72 adjacent the plates 77 and 77a. These rollers 79 are arranged to engage a wire and at the same time engage the wedging cams 74 to clamp the wire against its anvil and move the same forwardly in the machine. Springs 80 and 80a are arranged with an end thereof extending through the rear slots 76 of the plates 77 and 77a respectively and have the forward ends 80b each anchored in the adjacent cam blocks 73. The spring exerts a rearward pull on the plates 77 and 77a and upon the rollers 79 through plate carried pins 79a engaging the front sides of the rollers and causing the rollers to be wedged between the cams 74 and the wires when the table moves forwardly. When the table moves rearwardly the wires are held stationary by the fabricating mechanism as will hereinafter be described causing the springs 80 and 80a to yield and allow the rollers to move into deeper portions of the cams so that the rollers slip rearwardly over the wire.

As shown in Figures 1, 2 and 7, the table 60 is oscillated back and forth on the rods 66 through an oscillating link connection 81 with an adjustable cross head 82 on the end of the shaft 19 so that the oscillation of the table can be readily controlled by the eccentric throw of the cross head.

The gripping clutches 70 and 71 are independently controlled and can be disengaged from their wires W1 and W2 whenever a corresponding clutch on a wire drawing drum is disengaged. This independent control of the clutches 70 and 71 is effected by removing the pairs of guide pins 75 or 75a. The plates 77 and 77a together with the clutch rollers 79 may then be bodily removed from the reciprocating table 60 to provide a complete disengagement of the feeding mechanism with the wires $W_1$ and $W_2$. If only one of the clutches 70 and 71 requires disengagement, it is necessary to remove but one of the pairs of guide pins 75 or 75a. The pair removed will, of course, determine which of the desired wires is retained in stationary non-feeding relation to the table 60.

It should be understood that other types of wire grippers can be used in place of the roller clutches shown. Any device which engages the wire on the forward stroke of the machine and which slides over the wire on the reverse stroke of the machine is operable. In the illustrated clutches, two rollers 79 are provided for each wire and two cam surfaces 74 are provided for each pair of rollers to urge the rollers toward the anvil so as to grip the wire on the forward stroke of the machine and to permit the rollers to roll up on their cam surfaces on the reverse stroke of the machine. The rollers are urged to roll down their cam surfaces 74 by the spring urged plates 77 and 77a through the pins 79a. This insures that the rollers will grip the wire immediately at the beginning of each feeding stroke of the cross head 82.

From the feeding mechanism mounted on the reciprocating table 60 the wires pass under a gripping member 91 as shown in Figures 12 to 15 inclusive. The wire $W_1$ passes over a gripper 90 while the wire $W_2$ passes over a gripper 90a. These gripping members 90 and 91 also serve as the anvil against which the heads of the nails are formed.

Figure 13:
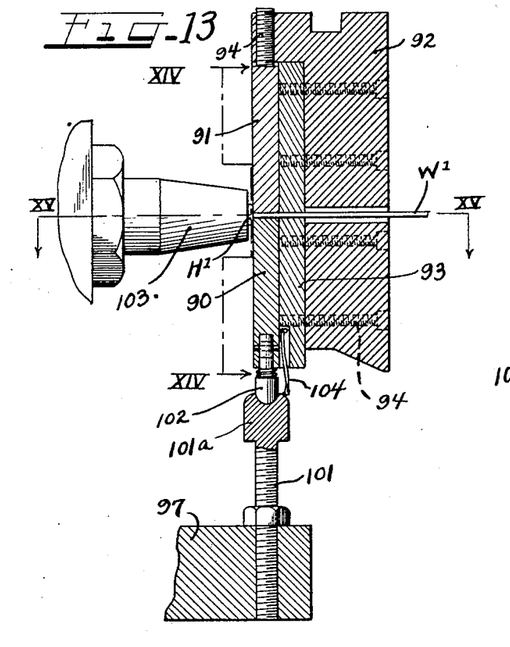
Figure 13 is an enlarged cross-sectional view, with parts in elevation, taken along the line XIII—XIII of Figure 12.
Figure 15:
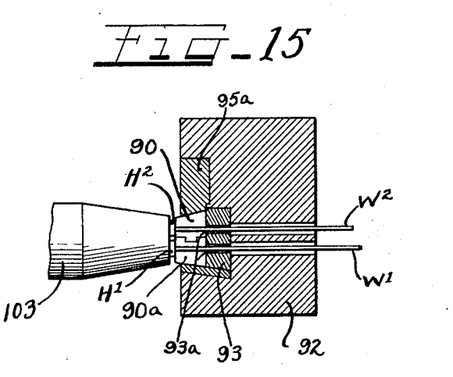
Figure 15 is a horizontal cross-sectional view taken along the line XV—XV of Figure 13.

The gripping members are operatively mounted in a stationary block 92 carried by the main frame 12 of the machine part B. The block 92, as shown in Figures 13 and 15, carries a backing plate 93 held in the block 92 by means of screws such as 94. The backing plate 93 is apertured as at 93a to receive the wires $W_1$ and $W_2$ therethrough. Likewise, the block 92 is apertured to receive the wires.

Figure 14:
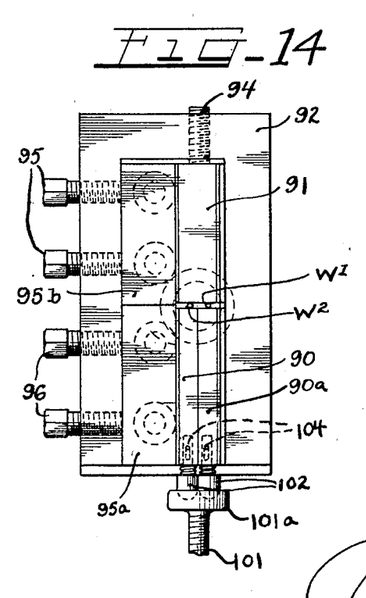
Figure 14 is an elevational view taken along the line XIV—XIV of Figure 13.

The upper gripping member 91 can be adjusted vertically relative to the backing plate and the supporting block 92 by means of a set screw 94 and is held in place by means of a pair of horizontal set screws 95 and a wedge block 95b (Fig. 14). The lower gripping members 90 and 90a are also held in place with horizontal set screws 96 and a wedge block 95a but these set screws are set to allow the members to slide vertically. The lower gripping members are reciprocated vertically relative to the block 92 and the backing plate 93 by means of a lever 97 pivoted on a shaft 98 (Fig. 11) carried by the main frame of the machine. The longer arm of the lever 97 is connected by a link or connecting rod 99 to the crank 100 of the main crank shaft 19.

Figure 11:
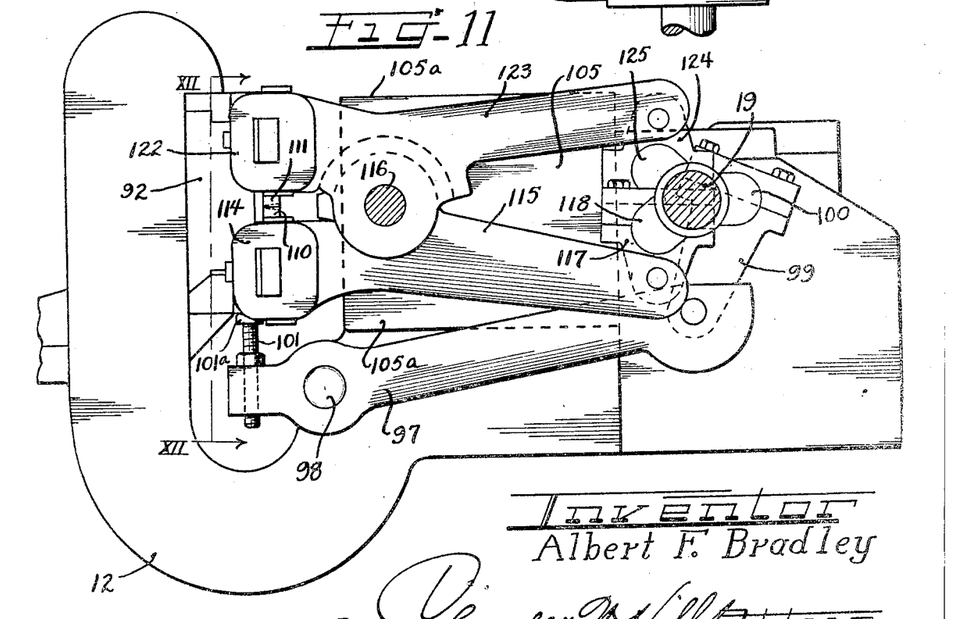
Figure 11 is a vertical cross-sectional view, with parts in elevation, taken along the line XI—XI of Figure 10.

The short arm of the lever 97 as shown in Figures 11, 12 and 13, carries an adjustable stud 101 with a double cup-shaped head 101a. Studs 102 are screwed into the bottoms of the lower gripping members 90 and 90a and the projecting ends are rounded to fit into a cup of the head 101a of the stud 101. Thus whenever the crank 100 of the main crank shaft 19 moves the long arm of the lever 97 down, the short arm thereof will raise and the two studs 101 and 102 will push the lower gripping member tightly against the wires $W_1$ and $W_2$ lying between it and the upper gripping member 91. The wires are thus held so that their projecting ends can be upset to form nail heads $H_1$ and $H_2$ by a single hammer or upsetting head 103 as shown in Figures 13 and 15. Straps or securing members 104 connect the lower grippers 90 and 90a with the stud head 101a so that when the short arm of the lever 97 moves down the lower gripping members will be pulled down and will release the headed wires $W_1$ and $W_2$, allowing the same to be fed forwardly. Separate studs 102 are provided so that each gripper 90 or 90a can be adjusted into the desired spaced relation with the upper gripper 91 and thus provide for the gripping of two wires having different diameters at the same time.

Figure 10:
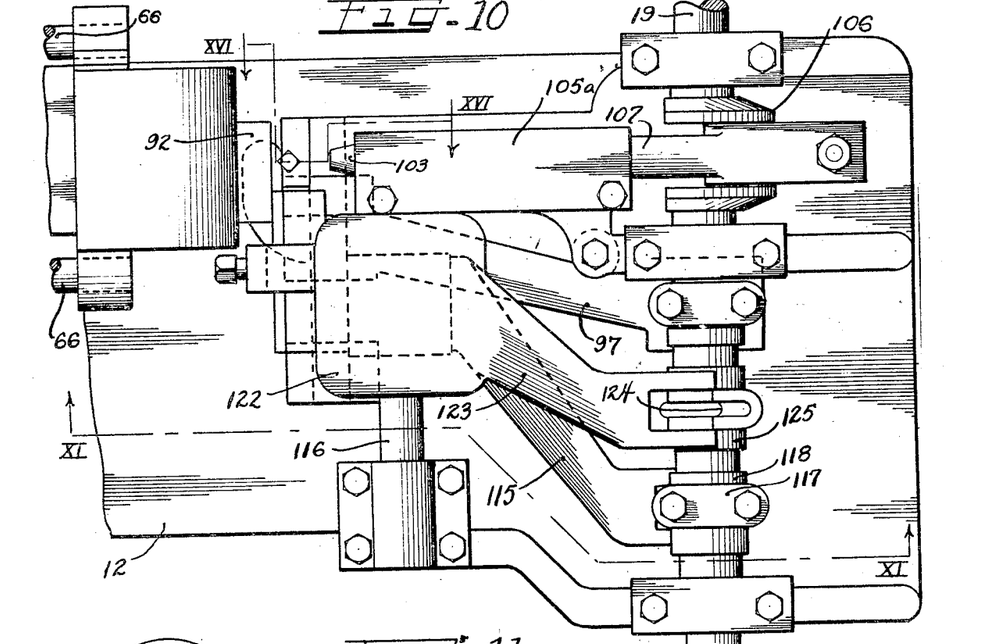
Figure 10 is an enlarged fragmental plan view taken along the line X—X of Figure 2.

The upsetting head 103 which forms the heads on the wires is carried by a slide 105 as shown in Figures 10 and 11. This slide 105 is reciprocally carried on guides 105a formed on the main frame 12 of the machine part B, and is moved back and forth by means of a crank 106 forming part of the crank shaft 19 and connected to the slide by means of a pitman or connecting rod 107.

The parts of the machine are so adjusted that after the heads $H_1$ and $H_2$ are formed on the ends of the wires $W_1$ and $W_2$, the header or upsetter 103 moves back when the gripping members 90 and 91 separate slightly to allow the feeding mechanism carried on the table 60 to move the wire forwardly the distance required to make nails of the length desired. This places the wires in the positions shown in Figure 16, whereupon they are simultaneously cut off and provided with points by a pair of cut off dies 110 and 111. The die 110 is secured by a set screw 112 in the jaw 113 formed in the head 114 of a lever or arm 115 pivoted on a shaft 116 carried by the main frame and having its rear end connected through a link 117 to a crank 118 of the main crank shaft 19 (Figures 10 and 11).

The upper die 111 is secured by a set screw 120 in the jaw 121 formed on the head 122 of a top lever member 123. The lever member 123 is pivoted intermediate its ends on the same shaft 116 as the lever 115 and is connected at its rear end through a connecting rod or link 124 with crank 125 of the main crank shaft 19. Cranks for operating the levers 115 and 123 are so arranged on the main crank shaft 19 that the cut off dies 110 and 111 cut the wires $W_1$ and $W_2$ to complete the nails by forming the points thereon when the forward travel of the wires has stopped. It will be noted from Figure 16 that the cut off dies are spaced forwardly from the grippers so that a sufficient amount of wire is left projecting out ahead of the block 92 to form the head of the next nail.

Figure 16:
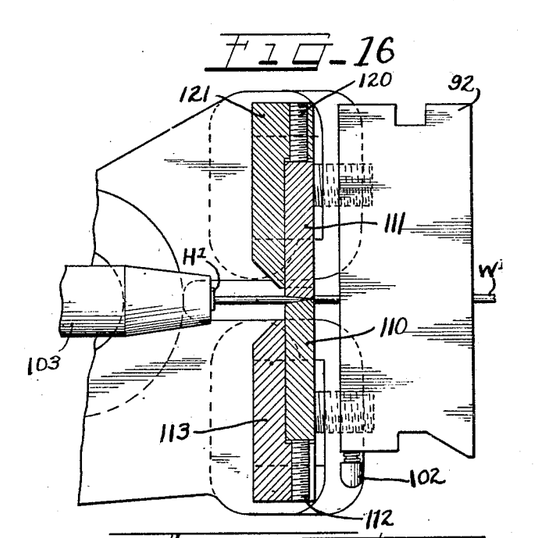
Figure 16 is an enlarged vertical cross-sectional view, with parts in elevation, taken along the line XVI—XVI of Figure 10.

At each cycle or revolution of the crank shaft 19, the header or upsetter 103 comes forwardly and upsets the projecting ends of the wires $W_1$ and $W_2$ to form heads thereon, the gripping members 90 and 91 separate slightly, allowing the wires to be fed forwardly by the feeding mechanism to the position shown in Figure 16. The cut off dies then cut off and point the wires at the time the gripping members are gripping the wires in a new position.

*Operation of the machine*

From the above description it will be understood that rods or wires $R_1$ and $R_2$ are fed into the machine through the first stage dies 30. The wires are pulled through the dies by means of the smaller pulleys 35a. The single drawn wires are wrapped for a few turns around the pulleys 34a and then passed backwardly over spring-urged sheaves 35, through the second stage dies 31, and around the larger pulleys 34b. The double-drawn wires are then wrapped for several turns around the pulleys 34b and pass rearwardly over the spring-urged sheaves 37, through the final stage dies 32 and around the large-diameter pulleys 34c. It should be understood that any number of drawing dies can be used and if only a single drawing operation is necessary for each wire, one die can be used for each wire.

The triple drawn wires are led off of the large pulleys 34c through the eye of the spring arm 39.

The smaller pulleys or drums are dimensioned to draw a slightly greater amount of wire than the larger pulleys and to gradually build up slack in the wire between the several stages of drawing. Thus slack may build up in the wire on the smaller pulleys so that the wire slips on the smaller pulley until the larger pulley pulls the wire taut, thus enabling the smaller pulleys to proceed with the drawing of the wire through the dies. Each time the wire begins to slip in the smaller pulleys and the slack between the drums is taken up by the larger drums, the resulting jerk is absorbed in the spring-urged sheaves which relieve stresses.

Since, as explained above, the feeding table 60 in the part B of the machine is intermittently operated, provision for slack in the wire between the larger drawing pulleys and the fabricating mechanism is made so that the slack or a portion thereof may be used to provide wire for the feeding stroke so that there will be a proper amount of wire present to be fed when the feeding table 60 moves on its forward stroke. This accumulation of slack between the drawing end of the machine and the fabricating end of the machine is necessary since the drawing end of the machine is continuously operating while the fabricating end of the machine is intermittently operating. Therefore, the spring arm 39 is provided to hold the wires taut as they leave the large pulleys 34c. The arm, carrying the eye, on the spring arm 39 tends to spring outwardly and upwardly to pull with it the wires passing through the eye. In other words, the greater the slack between the drawing end of the machine and the fabricating end of the machine the less will be the included angle between the portions of the wire on both sides of the eye on the spring arm 39. If there is no slack, the wires will lie in substantially a straight line between the drawing and fabricating ends of the machine. If the tensioning device were not provided the wire would slip on the pulleys. The spring arm 39 urges the wire upwardly to form a bow in the slack wire which is straightened out on the forward stroke of the fabricating machine.

The table 60 containing the guide pulleys and the gripping clutches is oscillated by the cross head on the main crank shaft 19 and the degree of oscillation is controlled by the cross head adjustment. The clutches grip the wire on the forward stroke of the table to move the same forwardly through the grippers 90 and 91 which are spaced apart during the forward stroke of the machine. Then on the reverse stroke of the table the clutches are released from the wire, the grippers 90 and 91 hold the wires in fixed position, and the upsetter or header 103 acts simultaneously on the leading ends of both wires to form heads thereon. On the next forward stroke of the machine the headed wires are moved through the cutting dies. On this stroke the upsetter is in retracted position, permitting forward movement of the headed wires. The cutting die is then closed to form the pointed ends on the nails and to cut the finished nails off the wires. The operations are again repeated on the next feed stroke.

Therefore every stroke of the machine produces at least two finished nails. If it is desired to cut out one of the wires passing through the machine the pulling drum 34 for that wire can be thrown out of operation by disengagement of the clutch provided in the drum and by disengagement of the roller clutches for that wire on the feeding table.

As explained above, the machine is adapted to simultaneously handle more than two wires by the provision of extra drawing dies, drawing drums, roller clutches, cutting dies and the like. A single upsetter or hammer can be used to simultaneously form heads on a plurality of wires during a single blow.

The machines of this invention have at least twice the capacity of the machines disclosed and claimed in the Albert F. Bradley prior Patent No. 2,107,745.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a combined wire drawing and wire fabricating machine, a plurality of wire drawing dies, a plurality of drums for pulling drawn wires through said dies, a common drive shaft for said drums, clutch devices for disengaging said drums from said drive shaft, a slack accumulator receiving said drawn wires from said drums, an intermittently operating feeding mechanism receiving the wires from said slack accumulator, and wire fabricating means for simultaneously acting on said plurality of wires to produce a plurality of wire products on each stroke of the machine.

2. In a metal fabricating apparatus, mechanism for simultaneously drawing a plurality of wires, a slack accumulator for the drawn wires, an intermittently operating feeding device receiving said drawn wires from said slack accumulator, individual clutches in said feeding device each acting on a wire to selectively cause the same to move forwardly with the feeding device, and common wire fabricating mechanism simultaneously acting upon said wires to fabricate a plurality of wire products during each stroke of the machine.

3. In a nail making machine the combination with nail fabricating mechanism of a continuously operating wire drawing mechanism for simultaneously reducing a plurality of metal rods into wires of the desired diameter, and a slack accumulator member for acting on said wires between said wire drawing means and said wire fabricating means whereby said fabricating means can be operated intermittently.

4. A multi-wire product making machine which comprises a continually operating wire drawing mechanism adapted for simultaneously reducing the diameters of a plurality of wires, an intermittently operating wire fabricating mechanism for simultaneously acting upon a plurality of wires, and a slack accumulator between said drawing mechanism and said fabricating mechanism receiving and tensioning the wires passing from the wire drawing mechanism to the wire fabricating mechanism.

5. In a metal fabricating device adapted to simultaneously operate on a plurality of wires, a slack accumulator for receiving said plurality of wires as they are fed continuously thereto, intermittently operated feeding means receiving said wires from the slack accumulator for moving the wires forwardly therefrom, and fabricating means operable alternately with said feeding means for fabricating the wires into a plurality of wire products.

6. In a metal fabricating device adapted to simultaneously operate on a plurality of wires, means for continuously feeding said wires in one direction, additional means spaced from said first means for intermittently feeding said wires in said one direction, a slack accumulator between said continuously and intermittently operated means for holding the wires therebetween under tension, means for holding said wires between intermittent feeding movements thereof, and a mechanism acting upon said held wires for simultaneously fabricating a plurality of wire products.

7. In a metal fabricating device including a reciprocally mounted feed table adapted to receive a plurality of wires, the improvement which comprises individual wire-gripping roller clutches for each of said wires mounted for movement relative to said table, means for moving said roller clutches with said table in one direction, an anvil for each of the roller clutches carried by said table, spring-urged cam means operable by the movement of said table for moving said clutch rollers toward said anvils, and means for independently adjusting each of said anvils toward and away from said roller clutches, an anvil and a roller clutch cooperating to grip a wire therebetween only when said anvil has been adjustably moved to a position in which the distance between the anvil and the roller clutch, after the latter has been fully moved by said cam means, is less than the thickness of an interposed wire.

ALBERT F. BRADLEY.